United States Patent
Slavens et al.

(10) Patent No.: US 10,240,464 B2
(45) Date of Patent: Mar. 26, 2019

(54) GAS TURBINE ENGINE AIRFOIL WITH LEADING EDGE TRENCH AND IMPINGEMENT COOLING

(71) Applicant: United Technologies Corporation, Farmington, CT (US)

(72) Inventors: Thomas N. Slavens, Vernon, CT (US); Brooks E. Snyder, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 421 days.

(21) Appl. No.: 15/035,837

(22) PCT Filed: Nov. 5, 2014

(86) PCT No.: PCT/US2014/064018
§ 371 (c)(1),
(2) Date: May 11, 2016

(87) PCT Pub. No.: WO2015/112225
PCT Pub. Date: Jul. 30, 2015

(65) Prior Publication Data
US 2016/0273365 A1    Sep. 22, 2016

Related U.S. Application Data (60) Provisional application No. 61/908,481, filed on Nov. 25, 2013.

(51) Int. Cl.
*F01D 9/02* (2006.01)
*F01D 5/18* (2006.01)
*F01D 25/12* (2006.01)

(52) U.S. Cl.
CPC ............... *F01D 5/187* (2013.01); *F01D 5/18* (2013.01); *F01D 5/186* (2013.01); *F01D 9/02* (2013.01);

(Continued)

(58) Field of Classification Search
CPC . F01D 5/18; F01D 5/186; F01D 5/187; F01D 9/02; F01D 25/12; F05D 2220/32;

(Continued)

(56) References Cited

U.S. PATENT DOCUMENTS 6,050,777 A   4/2000  Tabbita et al.
6,099,251 A   8/2000  Lafleur
(Continued)

FOREIGN PATENT DOCUMENTS

EP    2392774       12/2011
GB    2127105 A     4/1984

OTHER PUBLICATIONS

International Preliminary Report on Patentability for PCT Application No. PCT/US2014/064018, dated Jun. 9, 2016.

(Continued)

*Primary Examiner* — Matthew W Jellett
(74) *Attorney, Agent, or Firm* — Carlson, Gaskey & Olds, P.C.

(57) ABSTRACT

A gas turbine engine airfoil includes an airfoil structure including an exterior surface that is provided by an exterior wall that has a leading edge. A radially extending interior wall within the airfoil structure separates first and second radial cooling passages. The first cooling passage is arranged near the leading edge. A radially extending trench is in the leading edge. An impingement hole is provided in the interior wall and is configured to direct a cooling fluid from the second cooling passage to the first cooling passage and onto the exterior wall at the leading edge.

16 Claims, 4 Drawing Sheets

(52) U.S. Cl.
CPC .......... *F01D 25/12* (2013.01); *F05D 2220/32* (2013.01); *F05D 2230/31* (2013.01); *F05D 2260/201* (2013.01); *F05D 2260/202* (2013.01); *Y02T 50/673* (2013.01); *Y02T 50/676* (2013.01)

(58) Field of Classification Search
CPC ......... F05D 2260/201; F05D 2260/202; F05D 2230/31; Y02T 50/676
See application file for complete search history.

(56) References Cited

U.S. PATENT DOCUMENTS

| | | | |
|---|---|---|---|
| 6,164,912 | A | 12/2000 | Tabbita et al. |
| 6,210,112 | B1 | 4/2001 | Tabbita et al. |
| 6,955,522 | B2 | 10/2005 | Cunha et al. |
| 7,534,089 | B2 * | 5/2009 | Liang ...................... F01D 5/186 415/115 |
| 8,109,725 | B2 | 2/2012 | Abdel-Messeh et al. |
| 8,333,233 | B2 | 12/2012 | Abdel-Messeh et al. |
| 8,572,844 | B2 | 11/2013 | Piggush |
| 2006/0107668 | A1 | 5/2006 | Cunha et al. |
| 2013/0039777 | A1 | 2/2013 | Piggush et al. |
| 2013/0045111 | A1 | 2/2013 | Lee |
| 2013/0280091 | A1 | 10/2013 | Propheter-Hinckley et al. |
| 2013/0280092 | A1 * | 10/2013 | Xu .......................... F01D 5/187 416/97 R |

OTHER PUBLICATIONS

Supplementary European Search Report for European Application No. 14879571.9 dated Nov. 2, 2017.
International Search Report and Written Opinion for PCT/US2014/064018 dated Jul. 30, 2015.

* cited by examiner

FIG.6

GAS TURBINE ENGINE AIRFOIL WITH LEADING EDGE TRENCH AND IMPINGEMENT COOLING

CROSS-REFERENCE TO RELATED APPLICATIONS

This application claims priority to U.S. Provisional Application No. 61/908,481, which was filed on Nov. 25, 2013 and is incorporated herein by reference.

BACKGROUND

This disclosure relates to an airfoil having a leading edge cooling trench and impingement cooling.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

In the pursuit of ever higher efficiencies, gas turbine manufacturers have long relied on high and higher turbine inlet temperatures to provide boosts to overall engine performance. In typical modern engine applications the gas path temperatures within the turbine exceed the melting point of the component constituent materials. Due to this, dedicated cooling air is extracted from the compressor and used to cool the gas path components in the turbine incurring significant cycle penalties. Further, variable cycle engines, which utilize bypass ratio changes during operation, are being developed to increase engine overall fuel consumption. With features such as variable fan nozzles or variable turbine vanes, the bypass ratio of the engine can be shifted between high power situations to part power or cruise operation.

A primary mechanism in which to cool turbine gas path components is to utilize a series of in-wall channels which passes cooling air which is typically several hundreds to thousands of degrees colder than the gas path. In one type of cooling configuration, for very high heat load applications, impingement cooling is typically employed. These impingement holes are typically integrally formed within the ceramic core of the turbine blade and due to the nature of manufacturing of the ceramic core must lie parallel to the pull plane of the core die in a manner in which the pull action of the die release is still enabled. The limitation of implementation with inclusion to a cast core process imposes that impingement is limited in scope to this region negating its use widely across the airfoil unless secondary internal baffled devices are used.

Typically, the leading edge region of a turbine airfoil experiences the highest heat load of the entire part. The heat transfer coefficients located at the stagnation point of the airfoil are typically 1.5-2 times the values seen on the downstream portions of the airfoil. As a result, airfoil cooling configurations are typically setup to produce the highest cooling effectiveness in this location, which in turn consumes one of the largest amounts of air on the part. In another type of cooling configuration, film troughs or trenches are typically utilized to improve the film effectiveness of showerhead film. The trench creates a pocket of cool air that shields the leading edge from the hot gas path. The trench is typically machined after holes are drilled.

SUMMARY

In one exemplary embodiment, a gas turbine engine airfoil includes an airfoil structure including an exterior surface that is provided by an exterior wall that has a leading edge. A radially extending interior wall within the airfoil structure separates first and second radial cooling passages. The first cooling passage is arranged near the leading edge. A radially extending trench is in the leading edge. An impingement hole is provided in the interior wall and is configured to direct a cooling fluid from the second cooling passage to the first cooling passage and onto the exterior wall at the leading edge.

In a further embodiment of the above, the leading edge of the exterior wall includes interior pressure and suction side portions joined to one another.

In a further embodiment of any of the above, the first cooling passage ejects post-impingement air to the external surface of the airfoil through a series of cooling holes.

In a further embodiment of any of the above, the trench includes radially spaced apart trench cooling holes fluidly connecting the first cooling passage to the exterior surface.

In a further embodiment of any of the above, radially spaced apart bridges interconnect the interior pressure and suction side portions. The trench cooling holes are provided by the bridges.

In a further embodiment of any of the above, the trench cooling holes are slots.

In a further embodiment of any of the above, the pressure and suction side portion each include legs that are arranged parallel to one another.

In a further embodiment of any of the above, the trench is provided at an aerodynamic stagnation line.

In a further embodiment of any of the above, the interior pressure and suction side portions are generally U-shaped.

In a further embodiment of any of the above, the impingement hole is provided by a plurality of impingement hole rows. Each row is directed at a section of an interior surface in which the normal vector from that surface creates an acute angle of the mechanical chord line of the airfoil shape between 0-80 degrees.

In a further embodiment of any of the above, the first row of impingement holes is aligned with an inflection line of the interior pressure side portion. The second row of impingement holes is aligned with an inflection line of the interior suction side portion.

In another exemplary embodiment, a gas turbine engine airfoil includes an airfoil structure including an exterior surface that is provided by an exterior wall that has a leading edge. A radially extending interior wall within the airfoil structure separates the first and second radial cooling passages. The first cooling passage is arranged near the leading edge. At least two sets of impingement holes are provided in the interior wall and are configured to direct a cooling fluid from the second cooling passage to the first cooling passage and onto the exterior wall at the leading edge. A separating wall is provided between at least two sets of impingement holes that is joined to the interior and exterior walls and separates the first cooling passage into first and second passageways.

In a further embodiment of the above, the first cooling passage ejects post-impingement air to the external surface of the airfoil through a series of cooling holes.

In a further embodiment of any of the above, the impingement hole is provided by a plurality of impingement hole rows. Each row is directed at a section of an interior surface in which the normal vector from that surface creates an acute angle of the mechanical chord line of the airfoil shape between 0-80 degrees.

In a further embodiment of any of the above, the first row of impingement holes is aligned with an inflection line of the interior pressure side portion. The second row of impingement holes is aligned with an inflection line of the interior suction side portion.

In another exemplary embodiment, A method of manufacturing a gas turbine engine component, includes the steps of forming an airfoil structure that includes an exterior surface that is provided by an exterior wall that has a leading edge that connects a suction and pressure side, forming a radially extending interior wall within the airfoil structure separating a first and second radial cooling passages in which the first cooling passage is arranged near the leading edge, forming a plurality of adjacent impingement hole rows in the interior wall and configured to direct a cooling fluid from the second cooling passage to the first cooling passage, and forming a radially extending trench in the exterior wall of the first cavity.

In a further embodiment of the above, the providing step includes additively manufacturing the airfoil structure.

In a further embodiment of any of the above, the providing step includes additively manufacturing a core having a shape corresponding to the airfoil structure.

In a further embodiment of any of the above, the shape is a positive of the airfoil structure.

In a further embodiment of any of the above, the shape is a negative of the airfoil structure.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
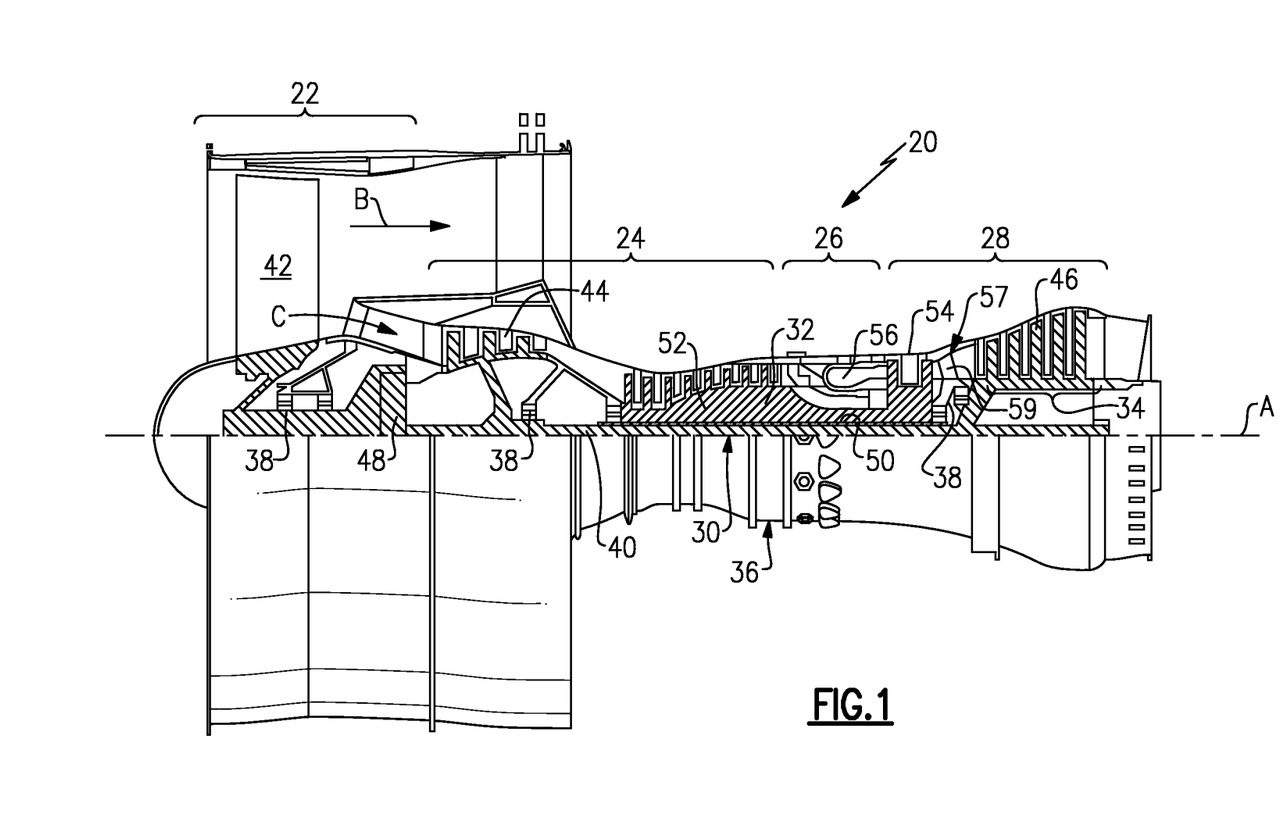
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The disclosed serpentine cooling configuration may be used in various gas turbine engine components. For exemplary purposes, a turbine blade 64 is described. It should be understood that the cooling arrangement may also be used in vanes, for example.

Figure 2A:
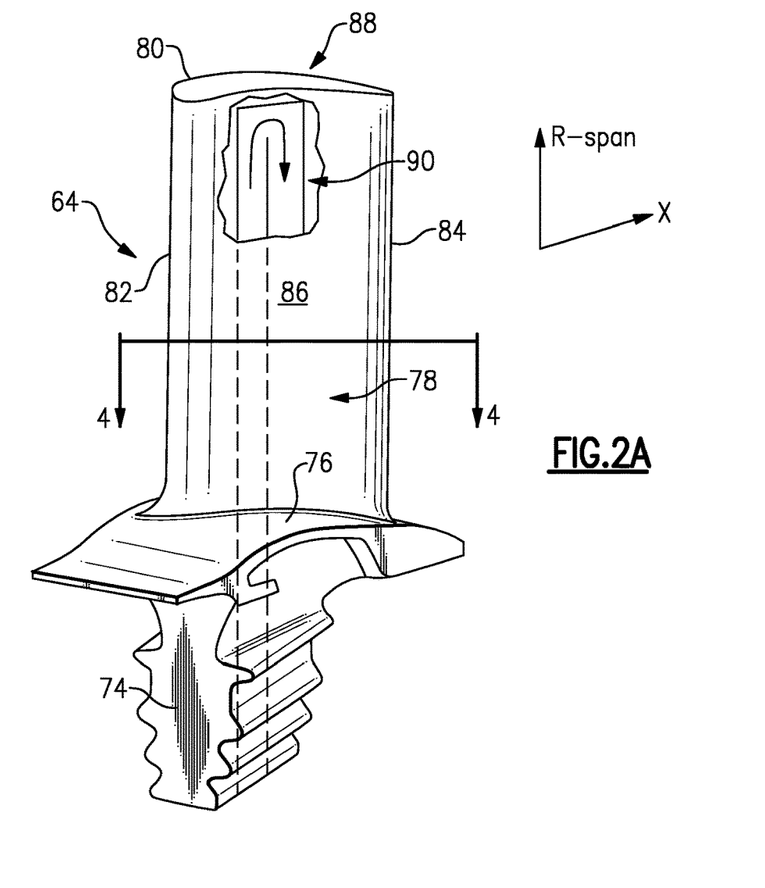
FIG. 2A is a perspective view of the airfoil having the disclosed cooling passage.
Figure 2B:
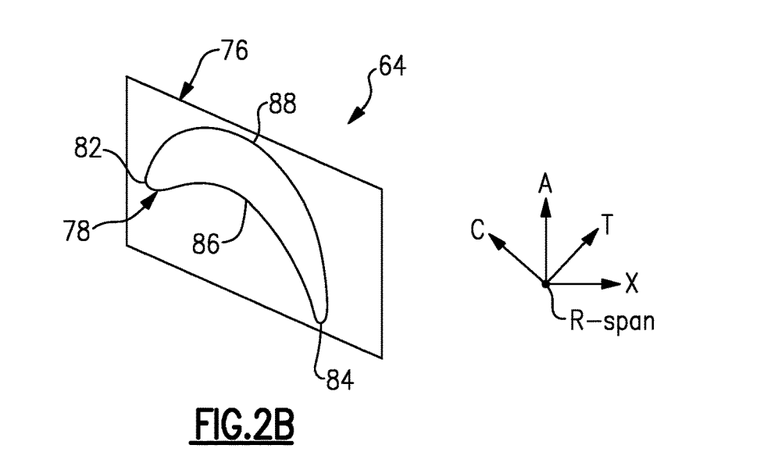
FIG. 2B is a plan view of the airfoil illustrating directional references.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction C from a leading edge 82 to a trailing edge 84. The airfoil 78 is provided between pressure (typically concave) and suction (typically convex) wall 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

The airfoil 78 includes a cooling passage 90 provided between the pressure and suction walls 86, 88. The exterior airfoil surface may include multiple film cooling holes (not shown) in fluid communication with the cooling passage 90.

Figure 3:
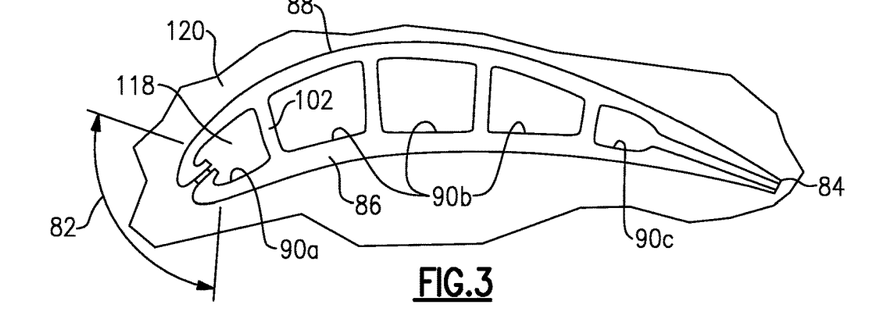
FIG. 3 is a cross-sectional view of an airfoil structure relative to a core.
Figure 4:
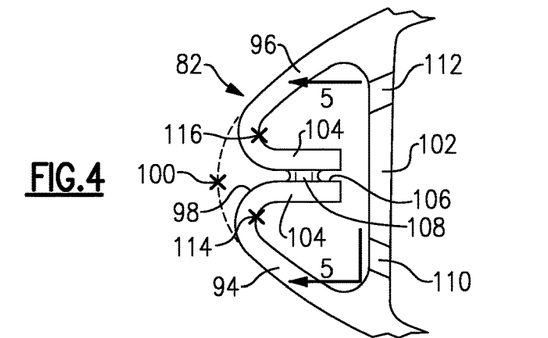
FIG. 4 is an enlarged cross-sectional view through a leading edge of the airfoil.

The airfoil 78 includes an exterior surface provided by an exterior wall. The exterior wall includes the pressure and suction walls 86, 88 and provides the leading edge 82. As illustrated in FIGS. 3 and 4, the leading edge includes a portion of the forward edge of the airfoil, which, for example, is approximately 270° of the forward edge. A stagnation line 100 is provided at the leading edge 82 where the air flow stagnates along the forward edge of the airfoil 78.

The cooling passages 90 are provided by a leading edge or first cooling passage 90a, serpentine passages 90b, and a trailing edge passage 90c. The forward-most serpentine cooling passage 90b may provide a second cooling passage that is separated from the first cooling passage 90a by an interior wall 102.

A radially extending trench 98 is provided in the leading edge 82 at the stagnation line 100. This stagnation line typically coincides with the mechanical meeting location between the pressure and suction sides of the airfoil, but in certain applications can deviate to locations back along the pressure side or suction side of the airfoil. Trench cooling holes 106 are arranged along the trench 98. The leading edge 82 is provided by pressure and suction side portions 94, 96, having legs 104 joined to one another. In the example, the legs 104 are parallel to one another. Bridges 108 interconnect the legs 104 and are spaced apart from another to provide the trench cooling holes 106, which may be slots in the example, best shown in FIG. 5.

Figure 5:
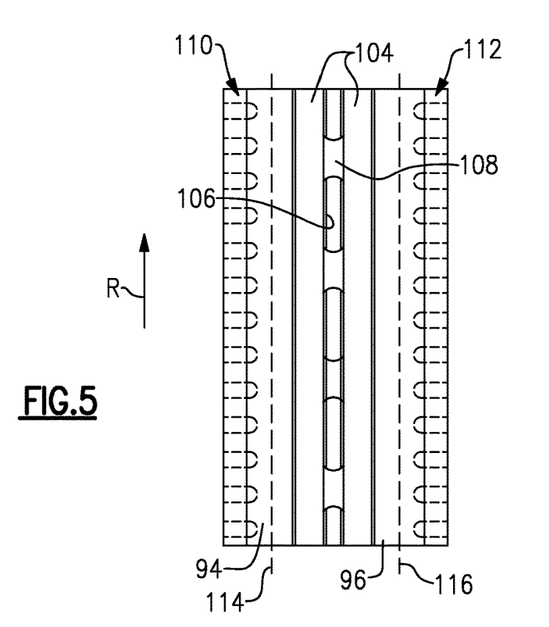
FIG. 5 is an interior view of the leading edge taken along line 5-5 of FIG. 4.

The leading edge 82 includes pressure and suction side portions 94, 96 that are generally U-shaped and each of which respectively include first and section inflection lines 114, 116. First and second rows of impingement holes 110, 112 are respectively aligned with the inflection lines 114, 116.

The two impingement rows to impinge into the U-shaped cavity along the leading edge of a turbine airfoil. The discrete holes lie in a radial row and are angled to a desirable impingement location along the leading edge region. Utilizing the current leading edge heat transfer coefficient correlation, the holes would be angled such that they impinge on the largest diameter of the interior of the cavity while balancing degradation effects of their impingement angle. Said another way, each row is directed at a section of interior surface in which the normal vector from that surface would create an acute angle of the mechanical chord line of the airfoil shape between 0-80 degrees.

The post impingement air pressurizes the cavity. The air then ejects through the leading edge trench cooling holes such that the diffusing bell-mouth acts as a traditional leading edge showerhead film row trough or trench. The trench cooling holes are sized such that the impingement hole total area is 1.5 times or more the area of the bridges thus maintaining part backflow margin.

Figure 6:
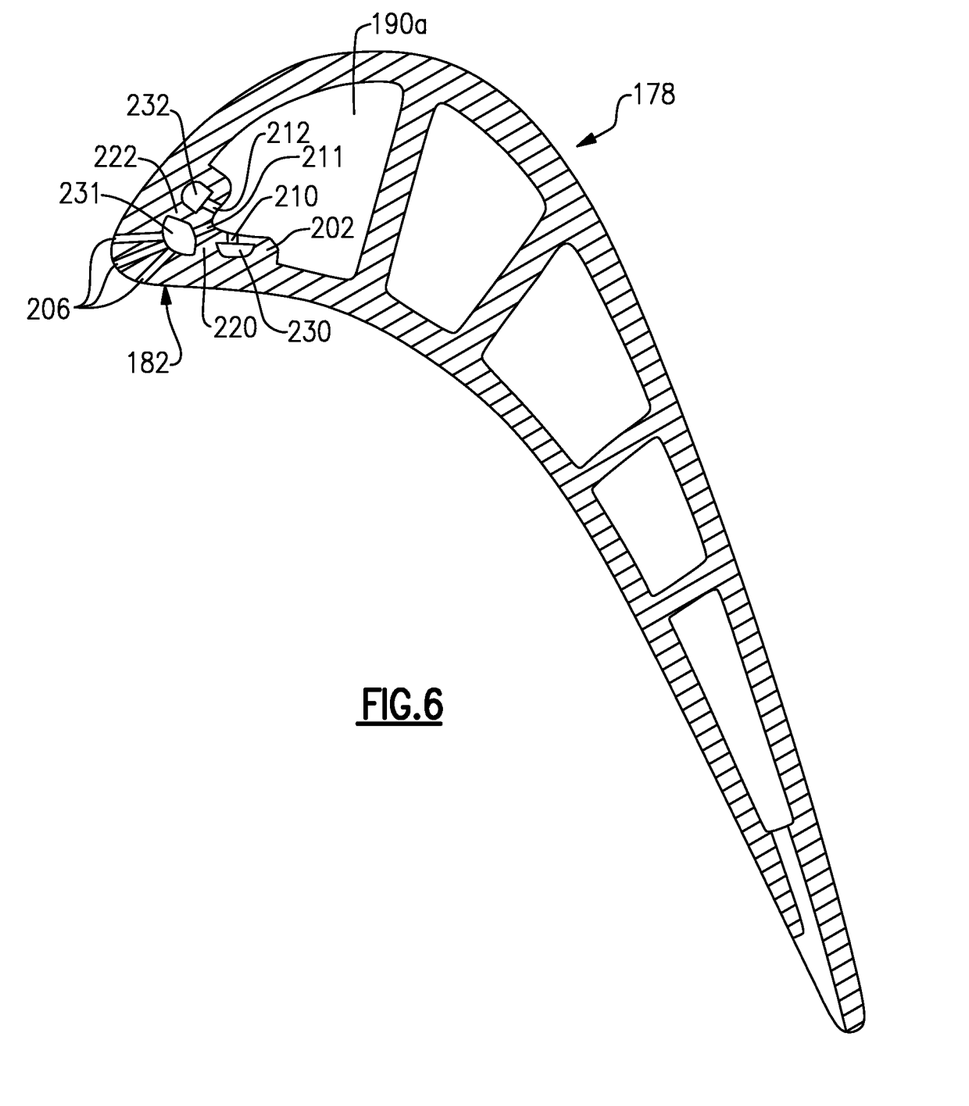
FIG. 6 is a cross-section of another example airfoil.

Another example of airfoil 178 with another impingement configuration is illustrated in FIG. 6. The interior wall 202 is provided in the cooling passage 190A. The interior wall 202 and the exterior wall at the leading edge 182 are interconnected to one another by separating walls 220, 222, which separates the leading edge passage in to first, second and third passageways 230, 231, 232. The additional separating walls 220, 222 provide a heat sink and additional surface area, which can be used to pull heat away from the leading edge 182.

First, second and third sets of impingement holes 210, 211, 212 direct cooling fluid from the cooling passage 190A into the passageways 230, 231, 232 to provide impingement cooling on to the exterior wall. Showerhead cooling holes 206 may be provided in the exterior wall at the leading edge 182 from the cooling passageway 231, for example.

The airfoil 78 may be manufactured in any suitable manner. The airfoil structure may be directly additively manufactured. Alternatively, first and second core portions 118, 120, as shown in FIG. 3, may be formed using conventional means, or additive manufacturing, by creating a negative or a positive of the airfoil structure. The core could be constructed using a variety of processes such as photopolymerized ceramic, electron beam melted powder refractory metal, or injected ceramic based on an additively built disposable core die. The airfoil structure can then be cast conventionally.

The advancement of additive manufacturing to create metal parts enables for extremely detailed, intricate, and adaptive feature designs. The ability to utilize this technology not only increases the design space of the parts but allows for a much higher degree of manufacturing robustness and adaptability. It enables the elimination of costly manufacturing tooling and allows for the 3D definition of the part to be made to be the only tooling needed for storage. Die-less cores or the integration of cores and shells can be additively manufactured for use in the casting process. This solution leverages either a direct build of a ceramic pour mold with interior core as one piece. In this manner the process capability of additive manufacturing is realized while retaining the material properties of traditional single crystal super alloys.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine airfoil comprising:
an airfoil structure including an exterior surface provided by an exterior wall having a leading edge, a radially extending interior wall within the airfoil structure separating first and second radial cooling passages, the first cooling passage arranged near the leading edge, a radially extending trench in the leading edge, and an impingement hole provided in the interior wall and configured to direct a cooling fluid from the second cooling passage to the first cooling passage and onto the exterior wall at the leading edge;
wherein the leading edge of the exterior wall includes interior pressure and suction side portions having legs joined to one another;
wherein the interior pressure and suction side portions are generally U-shaped; and
wherein the impingement hole is provided by a plurality of impingement hole rows, the plurality of impingement hole rows with each impingement hole directed along a vector towards a respective section of a curvilinear interior surface in which the vector is normal to that curvilinear interior surface to create a respective acute angle relative to the mechanical chord line of the airfoil shape, said respective acute angle being between about 0.degrees. to about 80.degrees.

2. The gas turbine engine airfoil according to claim 1, wherein the first cooling passage ejects post-impingement air to the external surface of the airfoil through a series of cooling holes.

3. The gas turbine engine airfoil according to claim 1, wherein the trench includes radially spaced apart trench cooling holes fluidly connecting the first cooling passage to the exterior surface.

4. The gas turbine engine airfoil according to claim 3, wherein radially spaced apart bridges interconnect the interior pressure and suction side portions, the trench cooling holes provided by the bridges.

5. The gas turbine engine airfoil according to claim 4, wherein the trench cooling holes are slots.

6. The gas turbine engine airfoil according to claim 1, wherein the pressure and suction side portion each include legs that are arranged parallel to one another.

7. The gas turbine engine airfoil according to claim 1, wherein the trench is provided at an aerodynamic stagnation line.

8. The gas turbine engine airfoil according to claim 1, wherein the plurality of impingement hole rows includes first and second rows of impingement holes, the first row of impingement holes is aligned with an inflection line of the interior pressure side portion, and the second row of impingement holes is aligned with an inflection line of the interior suction side portion.

9. A gas turbine engine airfoil comprising:
an airfoil structure including an exterior surface provided by an exterior wall having a leading edge, a radially extending interior wall within the airfoil structure separating first and second radial cooling passages, the first cooling passage arranged near the leading edge, at least two sets of impingement holes provided in the interior wall and configured to direct a cooling fluid from the second cooling passage to the first cooling passage and onto the exterior wall at the leading edge, and a separating wall provided between the at least two sets of impingement holes that is joined to the interior and exterior walls and separates the first cooling passage into first and second passageways;
wherein the leading edge of the exterior wall includes interior pressure and suction side portions having legs joined to one another;
wherein the interior pressure and suction side portions are generally U-shaped; and
wherein each of the sets of impingement holes are provided by a plurality of impingement hole rows, the plurality of impingement hole rows with each impingement hole directed along a vector towards a respective section of a curvilinear interior surface in which the vector is normal to that curvilinear interior surface to create a respective acute angle relative to the mechanical chord line of the airfoil shape, said respective acute angle being between about 0.degrees. to about 80.degrees.

10. The gas turbine engine airfoil according to claim 9, wherein the first cooling passage ejects post-impingement air to the external surface of the airfoil through a series of cooling holes.

11. The gas turbine engine airfoil according to claim 9, wherein the plurality of impingement hole rows includes first and second rows of impingement holes, the first row of impingement holes is aligned with an inflection line of the interior pressure side portion, and the second row of impingement holes is aligned with an inflection line of the interior suction side portion.

12. A method of manufacturing a gas turbine engine component, comprising the steps of:
(a) forming an airfoil structure including an exterior surface provided by an exterior wall having a leading edge connecting a suction and pressure side;
  wherein the leading edge of the exterior wall includes interior pressure and suction side portions having legs joined to one another;
  wherein the interior pressure and suction side portions are generally U-shaped;
(b) forming a radially extending interior wall within the airfoil structure separating a first and second radial cooling passages in which the first cooling passage is arranged near the leading edge;
(c) forming a plurality of adjacent impingement hole rows in the interior wall and configured to direct a cooling fluid from the second cooling passage to the first cooling passage;
  wherein the impingement hole is provided by a plurality of impingement hole rows, the plurality of impingement hole rows with each impingement hole directed along a vector towards a respective section of a curvilinear interior surface in which the vector is normal to that curvilinear interior surface to create a respective acute angle relative to the mechanical chord line of the airfoil shape, said respective acute angle being between about 0.degrees. to about 80.degrees; and
(d) forming a radially extending trench in the exterior wall of the first cavity.

13. The method according to claim 12, wherein the providing step includes additively manufacturing the airfoil structure.

14. The method according to claim 12, wherein the providing step includes additively manufacturing a core having a shape corresponding to the airfoil structure.

15. The method according to claim 14, wherein the shape is a positive of the airfoil structure.

16. The method according to claim 14, wherein the shape is a negative of the airfoil structure.

* * * * *